C. E. SPALDING.
VOTING MACHINE.
APPLICATION FILED SEPT. 17, 1906.
906,826.
Patented Dec. 15, 1908.
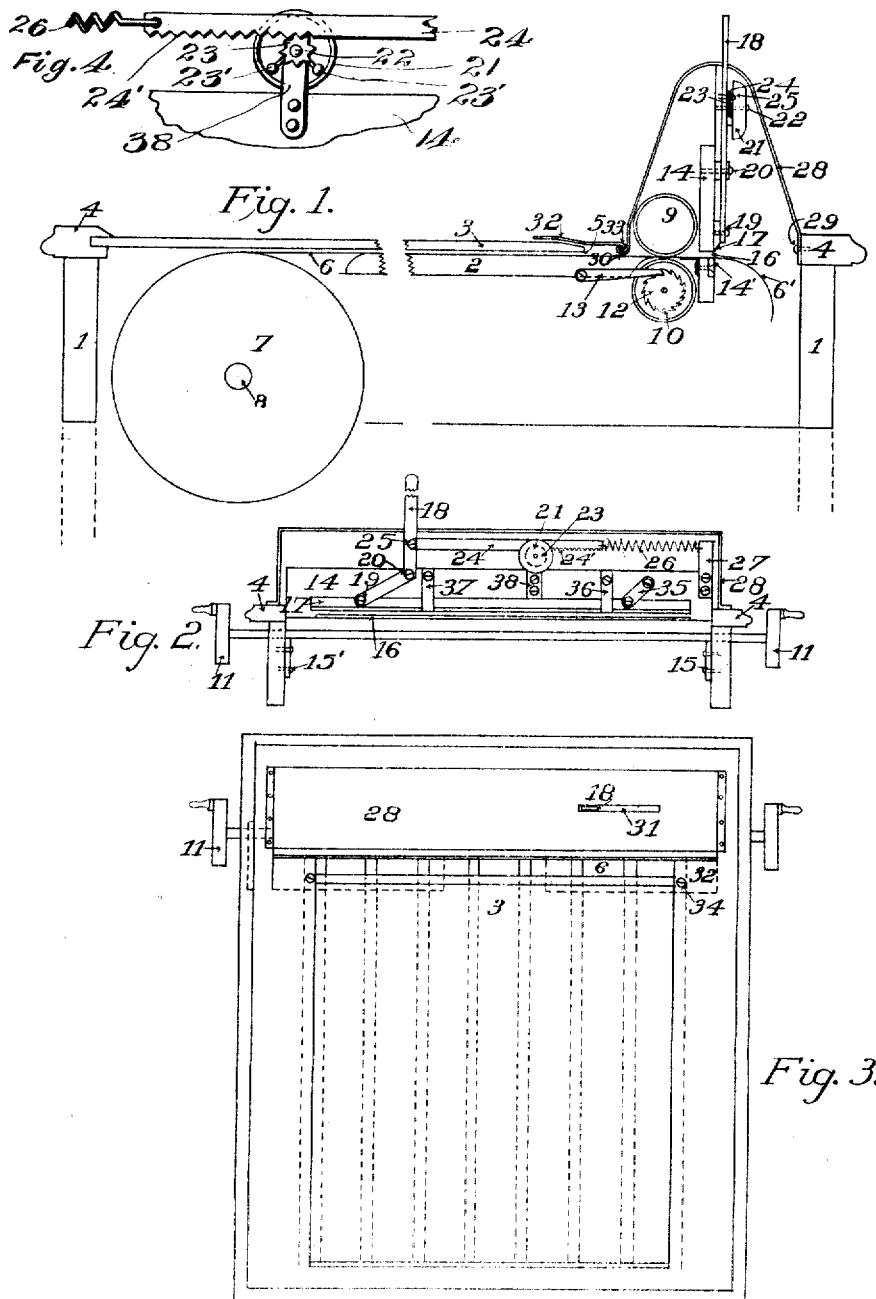
WITNESSES:
Martha Pope
W. H. Harwood
INVENTOR.
Clarence E. Spalding
BY Oliver & Ela
his ATTORNEYS.

UNITED STATES PATENT OFFICE.

CLARENCE E. SPALDING, OF MADISON, WISCONSIN.

VOTING-MACHINE.

No. 906,826.　　　Specification of Letters Patent.　　　Patented Dec. 15, 1908.

Application filed September 17, 1906. Serial No. 334,871.

*To all whom it may concern:*

Be it known that I, CLARENCE E. SPALDING, a citizen of the United States, residing at the city of Madison, in the county of Dane and State of Wisconsin, have invented a new and useful Improvement in Voting-Machines, of which the following is a specification.

My invention relates to improvements in voting machines especially adapted to use what is known as the "Australian" ballot.

Figure I, is a diagrammatic cross-section. Fig. II, is a rear view of the cutter and the registering mechanism. Fig. III, is a top view of the voting machine. Fig. IV is a detail view of the bell and its connections.

Similar letters refer to similar parts throughout the several views.

In Fig. I, 1 is the side of the ballot box; 2 is a portion of the cover, which extends across the width of the box and meets the top rim of the sides, 1, of the box and is rigidly attached to, 1; 3 is a section of plate glass, held in position by, 4, which is a frame, preferably of hard wood, which meets the top rim of, 1, and is removably attached to, 1, with means for locking it to, 1. This plate glass, 3, overlaps the part, 2, of the cover, leaving a narrow opening, 5, between the plate glass, 3, and the part, 2, of the top. 6, is a ballot in position, showing the ballot inserted between the part, 2, and the part, 3, with the printed portion of the ballot on the upper side of and directly under and visible through the part, 3. The ballot, 6, passes through the opening, 5, and is shown extended and ready to be sheared off and dropped into the box, as a completed ballot, at 6'.

The ballot is a part of and is unrolled from, 7, which is a roll of ballots inclosed within the box, upon the shaft, 8, as shown. 9, and, 10, are rollers placed so that their circumferences come in contact, as shown, and covered with some flexible material, preferably rubber, between which the ballot, 6, passes in its progress to 6'. These are controlled by a hand wheel, 11, shown in Fig. III. On the same shaft on which the roller, 10, is placed, and outside the box proper, is a notched wheel, 12, rigidly attached to the shaft of the roller, 10. This notched wheel is controlled by the part, 13, attached to the outside of the ballot box, the whole being to prevent the rollers from being turned in the wrong direction.

14, is a cast iron frame, firmly attached to the ballot box by the screw bolts, 15, and, 15', in Fig. II. The frame, 14, is provided with an opening, 16, shown also in Fig. II, through which the ballot passes in its progress to the ballot box after the vote has been registered.

Closely against the rear side of the cast iron frame, 14, and in position so as to leave the opening, 16, unobstructed, when the ballot is passing through, 16, is a cutter bar, 17, shown also in Fig. II, which is attached to the lever, 18, by the bolt at, 19; the lever, 18, is attached to the cast iron frame, 14, by the bolt, 20; all of which is more fully shown in Fig. II.

21 is a bell, which is firmly attached to a projection 38 of the cast iron frame, 14, by the threaded bolt 22 passing through the bell and into the projection from, 14, hereinafter described. The bell, 21, is provided with a ratchet wheel, 23, to which are attached proper hammers 23' for ringing the bell. This ratchet is operated by a toothed bar, 24, (toothed as shown at 24' in Fig. II) and attached to the lever, 18, at, 25, and also attached to the part, 14, by a spiral spring, 26, by means of the projecting part, 27, shown in Fig. II, so that the lever, 18, is always kept in position by the spring, 26, and the bell, 21, is always rung by any operation of the lever, 18. Over this entire mechanism for projecting the ballot from the shaft, 8, into the ballot box and for indicating the deposit of the ballot, by means of the bell, is a case, 28, of any desired material, preferably japanned iron, which is attached to the part, 4, of the ballot box by a proper screw at 29, and by such other means as may be expedient. This part, 28, comes down nearly to the part, 2, leaving a narrow opening, 30, between the part, 2, and the part, 28. This part, 28, is slotted to receive the lever, 14, and to permit its free action, as shown at 31, in Fig. III. The ballot is exposed at the opening between 5, and, 30, which opening is wide enough to permit the marking of the ballot at that point. To adapt the length of this opening to any width of ballot, are metal plates, 32, adapted to lock into and to slide in the fold of the case, 28, at 33, and provided with set screws, 34, (Fig. III) to hold the plate in permanent position, when adjusted.

Fig. II shows the part, 35, which is a link attached both to the cutter bar, 17, and to the part, 14, to control the action of the cutter bar.

36, and, 37, are springs firmly attached to the cast iron frame, 14, and extending down outside of the cutter bar to hold it in place as it is operated.

The lever, 18, is so constructed and so attached to the cutter bar, 17, as to give it both a downward and a shearing motion; an effective cutting edge is provided by a piece of steel, 14', firmly attached to a groove in 14, on the lower side of the opening, 16, and forming the lower edge of the opening, 16, in the part, 14.

38, is a projection either cast as a part of 14, or attached to it, to which the bell, 21, is attached for indicating the deposit of a ballot in the box. The frame, 14, is attached to the sides, 1, of the box by any suitable means, such as the screw, shown at 15, and 15', of Fig. II.

Fig. III shows a top view of the box, illustrating the manner in which the ballots are marked. The voter standing facing the columns, marks his ballot, 6, and after he has marked it, turns the hand wheel, 11, until the ballot presents the name of the next candidate for whom he wishes to vote, and so on continuously, until he has voted the ballot. When he has voted the full ballot, he turns the hand wheel until the ballot reaches a point to be indicated on the ballot, leaving the next ballot prepared to be voted; he then operates the lever 18, by throwing it over to the extreme right of the slot 31, in the case, 28, thereby driving the cutter bar, 17, downward in a sheering motion and cutting off the marked ballot, 6', which then drops into the ballot box as the completed ballot of the voter. The same process of drawing the lever, 18, over, as above described, rings the bell, 21, indicating that the voter has cast his ballot, and when the lever, 18, is released, the bell, 21, rings again to indicate that the lever has returned to position properly. The exposed space on the ballot where the opportunity is given the voter to mark the ballot is adjustably narrower than the width of the ballot itself, so that the margins of the ballot extend beyond the extremities of the opening, thereby making it impossible for the voter to insert a fraudulent ballot unless the ballot he inserts is either folded on its edges, or, is narrower than the official ballot, in either of which cases, the fraudulent ballot would be easily discoverable.

The purpose of this voting machine is to accomplish the protective features of the "Australian" ballot and similar ballots, and at the same time, dispense with at least two, and probably more of the election officers.

What I claim as my invention, and desire to secure by Letters Patent, is:—

1. The combination with a casing, a continuous sheet and rolls for moving the same, a cutter extending across said sheet, and suitably supported, a lever for moving said cutter, a spring supported toothed bar connected to the lever, and a bell adapted to be operated by said toothed bar.

2. In a voting machine the combination with a casing, a shaft carrying a continuous sheet and rolls for moving said sheet, a cutter extending over said sheet, a link and lever pivotally supporting said cutter, and a series of springs bearing against said cutter.

3. In a voting machine, the combination with a casing having an opening providing access for indicating a vote, a shaft carrying a continuous ballot sheet, parallel shafts with rolls for moving the sheet under said opening; a second casing inclosing a cutter suspended over said ballot sheet, a bracket, and spring guides for the cutter, a lever extending through a slot in the second casing for operating the cutter, and a spring for returning the cutter to operative position.

4. In a voting machine, the combination with a shaft carrying a continuous ballot sheet, means for moving said sheet, and indicating a vote, a cutter suspended over the ballot sheet, a bracket, an operating lever pivoted to the bracket and to said cutter, spring guides for the cutter, a bar connected to the lever and suspended by a spring, a bell having a rack wheel, and teeth on said bar for engaging said wheel to ring the bell.

In testimony whereof, I have hereunto signed my name in the presence of two subscribing witnesses.

CLARENCE E. SPALDING.

Witnesses:
EMERSON ELA,
MARTHA POPE.